July 26, 1966 W. T. SNOW, JR 3,262,245
APPARATUS FOR PACKAGING WITH SHRINKABLE FILM
Filed Jan. 29, 1963 2 Sheets-Sheet 1

July 26, 1966  W. T. SNOW, JR  3,262,245
APPARATUS FOR PACKAGING WITH SHRINKABLE FILM
Filed Jan. 29, 1963  2 Sheets-Sheet 2

United States Patent Office 3,262,245
Patented July 26, 1966

3,262,245
APPARATUS FOR PACKAGING WITH
SHRINKABLE FILM
William T. Snow, Jr., Greenville, S.C., assignor to
W. R. Grace & Co., Duncan, S.C., a corporation of
Connecticut
Filed Jan. 29, 1963, Ser. No. 254,676
4 Claims. (Cl. 53—184)

This invention relates to packaging apparatus and methods, and particularly to apparatus and methods for packaging with shrinkable films. It further relates to certain of the packages produced thereby.

High shrink energy biaxially oriented thermoplastic films are known to the art. Various methods and means for performing packaging operations with such films have previously been proposed. Virtually all of the known methods require relatively cumbersome and very expensive equipment and procedures. Furthermore, in automatic or semi-automatic operations, numerous expensive auxiliary items such as sheeters, conveyors, heating tunnels, etc., must also be provided.

It is a general object of this invention to provide simplified and relatively very inexpensive apparatus and methods for packaging with high shrink energy biaxially oriented thermoplastic films.

One specific object of this invention is to provide methods and apparatus for forming and applying a protective cover over the open side of product carrying containers, e.g., trays, bottles, cups, cans, jars, etc.

Another specific object is to provide methods and apparatus for packaging rigid and semi-rigid products in a tight fitting pouch or pouches of high shrink energy biaxially oriented thermoplastic film.

Yet another object is to provide a novel package comprising a rigid or semi-rigid product tightly but releasably enclosed within a pouch of thermoplastic film.

Still another object is to provide a novel package comprising a rigid or semi-rigid product or article hermetically enclosed within overlapping tight pouches of thermoplastic film.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are attained in the manner subsequently described utilizing high shrink energy, heat shrinkable, biaxially oriented thermoplastic films. "High shrink energy" films are, in accordance with this invention, those having a shrink energy of at least about 100 pounds per square inch and a percentage shrink of at least about 20 percent in each of the transverse and longitudinal dimensions when heated to shrinking temperature. A representative example of such films, and the film preferably used in this invention, is irradiated, biaxially oriented polyethylene film. High shrink energy, irradiated, biaxially oriented polyethylene film is a commercially available material. It can be made for example by the procedures described in Baird et al., U.S. Patent 3,022,543, the entire disclosure of which is incorporated herein by reference.

Figure 1:
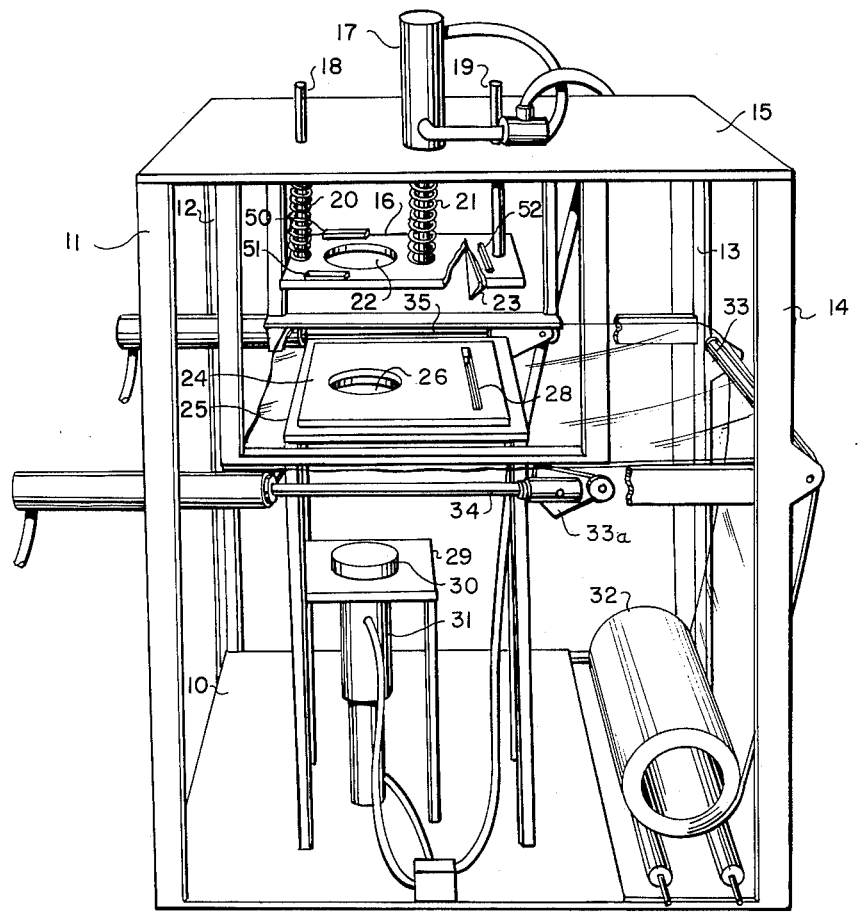
FIGURE 1 is a side view in perspective of an apparatus embodying the invention.

Broadly the apparatus of this invention comprises a heating plate, a resilient surfaced bed plate, means for feeding a sheet of high shrink energy heat shrinkable film between the two plates, means for bringing the heating plate and bed plate into contact with each other, and means for supporting a container to be covered or an object to be enclosed within and at a height at least partially between the contact point of the heating and bed plates. Preferably the apparatus further includes a hot cutting blade rigidly attached to the heating plate and adapted to partially or fully slice the trailing edge of the film sheet fed between the said plate and the bed plate.

In the embodiment illustrated there is a base plate 10 having four upstanding support legs 11, 12, 13 and 14. A top plate 15 is supported at the upper extremity of the legs 11, 12, etc. Suspended from the top plate is hot plate 16. Means, such as pneumatically driven piston 17, are provided to reciprocate the hot plate in a substantially vertical direction. Guide rods 18, 19 or other like means keep the vertically reciprocable hot plate in a substantially horizontal plane and restraining means such as coil springs 20, 21 limit the upward travel of the hot plate. An orifice 22 of a size slightly larger (e.g. about ¼ inch in each dimension) than the container or object to be covered or packaged is cut through the plate. Preferably a cutting blade 23 is securely attached to the feed end of the hot plate (i.e., the end of the plate from which the high shrink energy heat-shrinkable film is fed). Heat in the hot plate also keeps this cutting blade at a high temperature. Any suitable means may be used to heat the plate 16, e.g., electric resistance heaters 50, 51 and 52 or the like.

Mounted directly below the hot plate is resilient, heat resistant bed plate 24 supported on table 25 or any other suitable means. The bed plate has a size at least as large as the reciprocating hot plate, and the hot plate is capable of traveling downward for a distance at least sufficient to contact the bed plate. An orifice 26 of a size substantially the same as orifice 22 is cut through bed plate 24 and the top of support table 25. The two orifices are located in the respective plates so as to substantially align with each other when the plates are in contact. A slot 28 of a size and location to accommodate cutting blade 23 is also cut through the bed plate.

Beneath the table 25 there is a container or article support platform 29, mounted for reciprocal vertical movement in substantially axial alignment with the orifice 26 in the bed plate. The travel distance and the height of pedestal 30 is sufficient to raise a container to be covered through the orifice 26 to a height where the open top side of the container is on a plane at least slightly above the top plane of bed plate 24. When a rigid or semi-rigid article is to be packaged in accordance with the invention the pedestal has a smaller area than the bottom area of the article, and is of a height sufficient to raise an article resting thereon through orifice 26 to a height where the bottom of the article is on a plane at least slightly above the top plane of the bed plate.

Numerous means can be used to reciprocate the support platform through orifice 26. In the apparatus illustrated such means comprise a pneumatically operated air cylinder 31.

High shrink energy heat shrinkable thermoplastic film used in the process is supplied from any suitable source, e.g., roll 32 from which film is fed over idler roll 33 and thence in a path between the hot plate and bed plate. Any one of a wide variety of film feed means may be used. In FIGURE 1 such means comprise commercially available "snatch and grab" fingers 33a located on each side of the film web and reciprocable on horizontal rails 34 and 35.

Figure 2A:
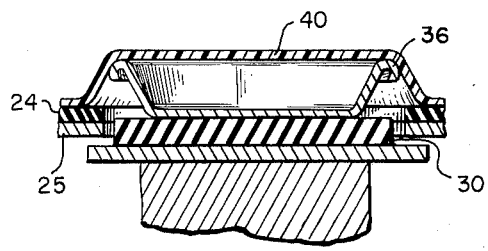
FIGURE 2a is a diagrammatic illustration of an intermediate step in formation of a shrink cover over the open side of a container.

In forming a shrink cover the process is as follows: an open sided container 36 e.g. a pie plate, is placed on pedestal 30 of the lift platform. High shrink energy heat shrinkable film 40, e.g., irradiated biaxially oriented polyethylene film, is drawn by the snatch and grab fingers between the hot plate and bed plate, resting on the bed plate when the fingers are released. The lift platform is actuated, raising the container through orifice 26 to a height where its open side is at least slightly above the top plane of the bed plate but not higher than a point where the bottom of the container and the top of the bed plate are in essentially the same plane. Film lying on the bed plate will thus be partially draped over the container top (see FIGURE 2a). The hot plate is then lowered until it contacts the film and lightly presses the portion of the film surrounding the container into contact with the resilient base plate. The resiliency of the base plate assures intimate contact of the hot plate with all portions of the film surrounding container.

As the hot plate is lowered the cutting blade at least partially slices the trailing end of the film web. The heat of the cutting blade creates a bead at the cut edge of the film.

Figure 2B:
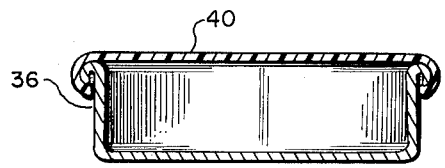
FIGURE 2b is an enlarged vertical section of a covered container made in accordance with the invention.

The hot plate heats the film to a temperature sufficient to shrink the same. For irradiated biaxially oriented polyethylene film the plate is maintained at about 500° Fahrenheit. The film is heated to shrink temperature after being in contact with the plate for only a fraction of a second e.g., 0.1 to 0.5 seconds. After this very short contact time the hot plate is raised. In those instances where the cutting blade only partially slices the film web, the partial slice at the trailing edge of the film is quickly propagated across the entire width of the film web by film shrinkage and the heated film, now free of any restraint, virtually snaps into contact with and around the periphery of the container. The film directly over the top of the container becomes a substantially taut cover. When a square of film is positioned on a round container opening the subsequent shrinking provides small, unobtrusive tabs which aid in removing the cover. The cover has been found to seal tightly by its own tension in most cases. An especially good bond can be obtained by coating the outside of the container in the sealing area with wax or other like material. If desired or necessary any slight wrinkles in the cover portion of the film can be removed by briefly heating this portion as, e.g., by applying thereon air from a hot air gun. In this manner a very taut, wrinkle-free, tight fitting shrink cover is formed over the container and product therein, as illustrated for example in FIGURE 2b. The lift platform is lowered, the covered container removed, another container to be covered placed thereon and the cycle repeated.

The process described can be used with all types of containers, including trays, bottles, etc. made from thermoplastic materials such as polystyrene and the like. This versatility in the types of containers that can be used is not available in the known shrink cover processes.

Figure 3:
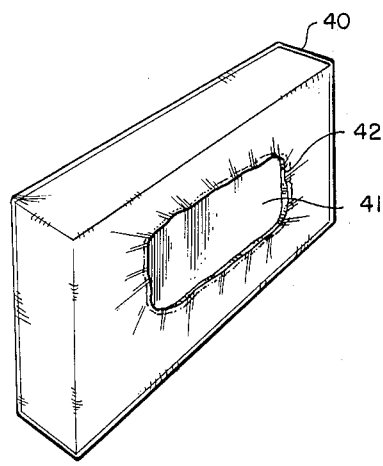
FIGURE 3 is a bottom view, in perspective, of a pouch package of the invention.

To enclose a rigid or semi-rigid article the procedure is substantially the same as with forming shrink covers. The basic difference is that the article, e.g. box 41, is held at a height where its bottom portion is slightly above the plane of the bed plate. In this case the heated film snaps completely under the article and forms a tight cover over the top, sides and partially over the bottom of the article (see FIGURE 3). The elastic bead 42 around the periphery of the film edges permits removal of the cover from the article.

Figure 4:
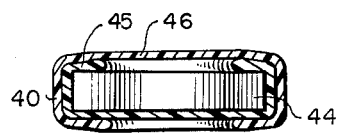
FIGURE 4 is an enlarged vertical section of a hermetic package made in accordnace with the invention.

To form a hermetic covering over a rigid or semi-rigid article, the article covered as described above, is, for example, turned over and a second partially overlapping cover is applied in the same manner as the first. Such a package is illustrated in FIGURE 4 where the article 44 is a roll of moisture-sensitive tape, and the first and second covers are designated 45 and 46, respectively. The overlapping taut covers form a tightly sealed hermetic package. A package of this type can also be made by placing the product on a sheet of film, snapping a first cover up, putting a second sheet of film over this package and snapping a second cover down without turning the package over.

Many variations of the described apparatus will be apparent to those skilled in the art.

For example, the process can be performed using a substantially inverted apparatus wherein a container, for example, is supported on an insulated portion of a hot plate, a sheet of film is supported over the container and the hot plate raised to lift the container through an orifice in a stationary bed plate and to briefly hold the film portions surrounding the orifice so that when the hot plate is lowered the heat film portion will snap into tight engagement with the sides of the container.

While the foregoing description is necessarily detailed, it is to be understood that various rearrangement of parts and alternate elements or combinations of elements may be resorted to without departing from the scope or spirit of the invention as hereinafter claimed.

What is claimed is:

1. Apparatus for forming a shrink cover over an article comprising
   (a) a stationary resilient, heat resistant bed plate having an orifice therein just slightly larger than the article to be covered;
   (b) a support platform capable of lifting and lowering the article through said bed plate orifice to a height where at least the upper portion of said article is on a plane at least slightly above the top plane of the bed plate;
   (c) means for feeding a sheet of high shrink energy, heat shrinkable thermoplastic film over the said bed plate;
   (d) a hot plate maintained at a temperature sufficient to heat said film to shrinking temperature and reciprocally movable into contact with film lying over said resilient bed plate, said hot plate having an orifice of a size slightly larger than said article and located to fit over the article.

2. Device as defined in claim 1 wherein a cutting blade is attached to and heated by said hot plate and a slot is cut in said bed plate to accommodate said blade when the two plates are in contact.

3. Device of the class described comprising a hot plate maintained at temperatures sufficient to heat high shrink eenrgy heat shrinkable thermoplastic film to shrink temperatures, a resilient heat resistant bed plate, means for bringing the said plates into contact with each other, means for supporting an article to be covered adapted to position at least the upper portion of said article between the two plates and at a point above the plane where the two plates are in contact; a recess in said hot plate adapted to receive said upper portion when said plates are in contact and means for feeding high shrink energy heat shrinkable thermoplastic film between the two plates when they are in non-contacting position.

4. Device as defined in claim 3 wherein a cutting blade is secured to and heated by said hot plate.

References Cited by the Examiner

UNITED STATES PATENTS

| | | | |
|---|---|---|---|
| 2,754,959 | 7/1956 | McCarty | 206—45.33 |
| 2,785,519 | 3/1957 | Rumsey | 53—184 |
| 2,878,174 | 3/1959 | Rainer et al. | |
| 2,975,931 | 3/1961 | Harrison. | |
| 2,991,602 | 7/1961 | Van De Kerke et al. | 53—39 |
| 3,017,729 | 1/1962 | Cheeley | 53—184 XR |
| 3,034,271 | 5/1962 | Carpenter et al. | |
| 3,060,655 | 10/1962 | Dreyfus. | |
| 3,076,299 | 2/1963 | Lerner | 53—184 |
| 3,092,246 | 6/1963 | Harrison et al. | 206—45.33 |

FRANK E. BAILEY, *Primary Examiner.*

J. DRUMMOND, W. T. DIXSON, A. E. FOURNIER,
*Examiners.*